United States Patent [19]

Tippmer

[11] 4,101,642

[45] Jul. 18, 1978

[54] METHOD FOR CONVERTING THE AMMONIA AND HYDROGEN SULFIDE CONTAINED IN COKE-OVEN GASES INTO NITROGEN AND WATER AND SULFUR RESPECTIVELY

[75] Inventor: Kurt Tippmer, Recklinghausen, Germany

[73] Assignee: Firma Carl Still, Germany

[21] Appl. No.: 713,494

[22] Filed: Aug. 11, 1976

[30] Foreign Application Priority Data

Aug. 22, 1975 [DE] Fed. Rep. of Germany ....... 2537451

[51] Int. Cl.$^2$ .............................................. C01B 17/04
[52] U.S. Cl. ................. 423/573 G; 423/237; 423/574 R
[58] Field of Search ............... 423/237, 573, 574, 576

[56] References Cited

U.S. PATENT DOCUMENTS

| | | | |
|---|---|---|---|
| 2,808,317 | 10/1957 | Schmalenbach et al. ........... | 423/571 |
| 3,822,337 | 7/1974 | Wunderluh et al. ................. | 423/574 |
| 3,822,341 | 7/1974 | Smith .................................... | 423/574 |
| 3,970,743 | 7/1976 | Beavon ................................. | 423/574 |

*Primary Examiner*—G. O. Peters
*Attorney, Agent, or Firm*—McGlew and Tuttle

[57] ABSTRACT

A process for converting ammonia and hydrogen sulfide in coke oven gases into nitrogen, water and sulfur comprises, mixing the oven gases with oxygen and a portion of the waste gases of the process from which all the ammonia and most of the hydrogen sulfide has been removed, burning the mixture in a combustion chamber and passing the resulting gaseous products over a catalyst to convert the ammonia into water and nitrogen, mixing the gases after they pass over the catalyst with oxygen and another portion of the waste gases, and cooling the mixture and removing the condensed sulfur therefrom to form remaining products. The remaining products are further processed to remove additional sulfur, to condense and remove water. A portion of the remaining products are returned to the process in the form of waste gases.

4 Claims, 1 Drawing Figure

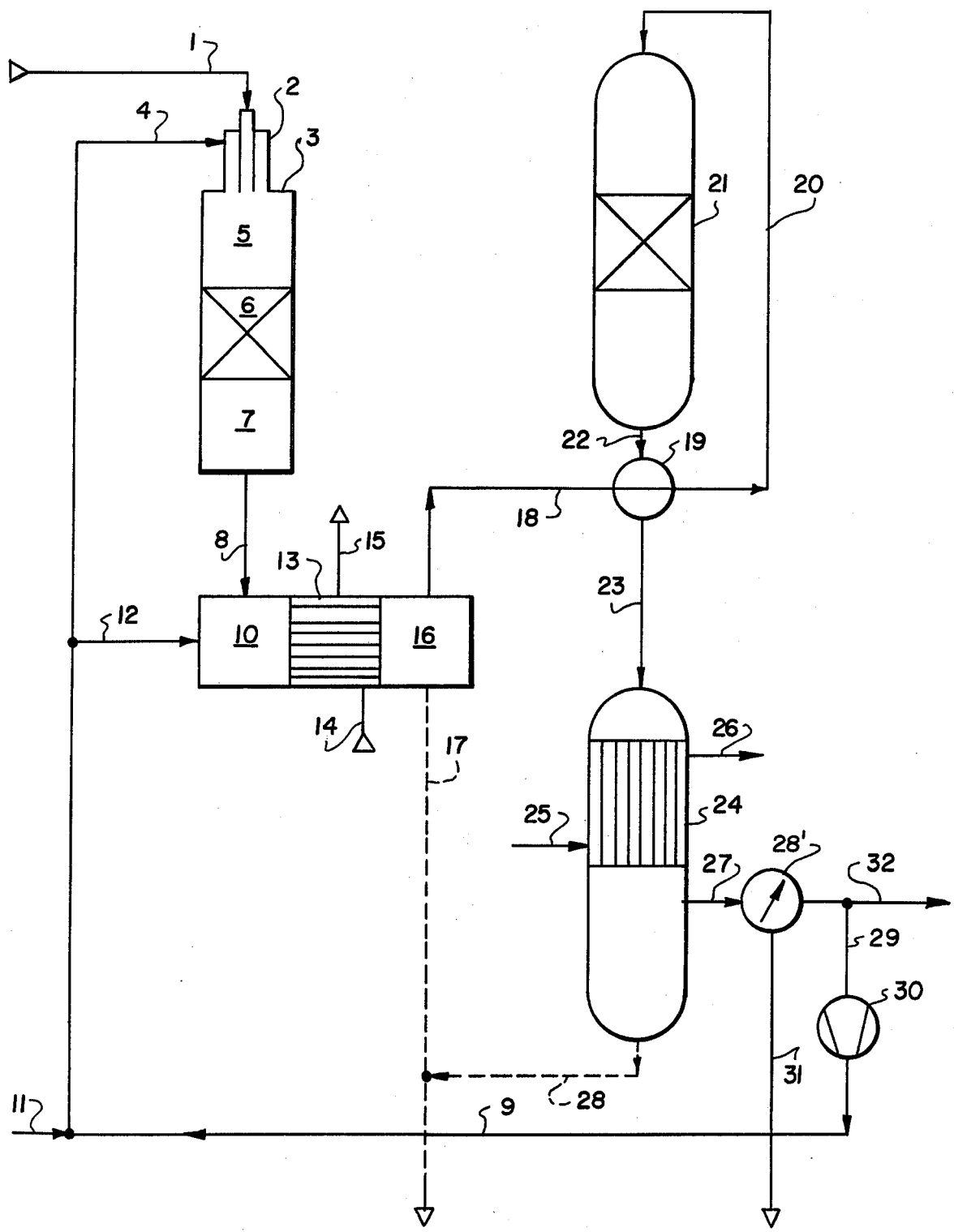

METHOD FOR CONVERTING THE AMMONIA AND HYDROGEN SULFIDE CONTAINED IN COKE-OVEN GASES INTO NITROGEN AND WATER AND SULFUR RESPECTIVELY

FIELD AND BACKGROUND OF THE INVENTION

This invention relates in general to coke oven processes and in particular to a new and useful process for converting ammonia and hydrogen sulfide in coke oven gases to nitrogen, water and sulfur.

DESCRIPTION OF THE PRIOR ART

There is a known method for completely removing the volume of free ammonia contained in coke oven gases, which has been scrubbed with water and enriched in the so-called deacidizer fumes of a wet scrubber operated on an ammonia-circulation process, by decomposing it into nitrogen and water, in which the entire volume of the deacidizer fumes is burned with a volume of air sufficient for converting the ammonia to nitrogen and water and the hydrogen sulfide to sulfer. The heat of combustion of the ammonia is recovered in the form of high pressure steam and the combustion gases are then worked for sulfer in a known manner (e.g. German Pat. No. 1,212,052).

A method is also known for decomposing the ammonia contained in coke oven and gas work gases, by using the fumes produced during stripping of the scrubber washings and condensates being heated and directed through a decomposition zone. This zone may be free space, a space filled with temperature-resistant filling bodies or a nickel catalyst of any shape. The decomposition zone is supplied with these fumes without preliminary deacidizing (e.g. German Pat. No. 1,223,818). In this method, a catalyst (e.g. a nickel catalyst) may be used. The hydrogen sulfide passes through the process without being changed and may then be processed in any manner, for example, to obtain sulfur or sulfuric acid.

In the simultaneous conversion of ammonia and hydrogen sulfide by using air as the oxidizer, the large nitrogen volume which, necessarily, is introduced at the same time, has an unfavorable effect on the thermal balance, and the large amount of waste gas entails great losses in the sulfur output which, in the methods of the prior art, does not exceed 90%. This is true, particularly for the processing of deacidizer fumes having small concentrations of ammonia and hydrogen sulfide. Fuel gases are frequently added in order to attain the required ammonia decomposition temperature in such a case, thereby further reducing the concentration of ammonia and hydrogen sulfide in the gas mixture and further increasing the volume of waste gas.

SUMMARY OF THE INVENTION

The present invention provides a method of the type outlined above, in which the volumes of the reaction gases and waste gases are reduced and made independent of the volume of nitrogen; nitrogen being necessarily introduced with combustion air. The purpose is to obtain a more satisfactory thermal balance and conditions for better sulfur output. This is important in view of the requirements for keeping the air clean, because the residual sulfur still contained in the waste gases passes into the outer atmosphere.

For this reason and in accordance with the invention, the deacidizer fumes containing ammonia and hydrogen sulfide are converted in two stages. Conversion is effected by means of pure oxygen or gases enriched with oxygen, and a part of the waste gases of the reaction, from which the ammonia and hydrogen sulfide have been removed and which have been cooled. The waste gases are recycled into the circuit and united with the deacidizer fumes or with the oxygen.

Recycling of one part of the cooled waste gases and dividing of the process into two stages is provided in order to keep the temperature of conversion within the limits of 1000° C to 1200° C. In addition, the purpose of stabilizing this temperature level and facilitating the adjustment thereof is thereby realized. The recycled volume of waste gases in the invention is substantially smaller than the nitrogen volume carried in the system when air us used.

The invention is particularly important for coking plants of ironworks, where air-separation devices are installed and pure oxygen is available in satisfactory quantities for treating and refining the pig iron.

Objects of the invention are to provide a method for converting ammonia and hydrogen sulfide in coke oven gases to nitrogen, water and sulfur in which the sulfur output is increased while the volume of gases in the system remains low in order to realize a favorable thermal balance.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there is illustrated a preferred embodiment of the invention.

BRIEF DESCRIPTION OF THE DRAWINGS

The sole FIGURE in the application is a schematic flow chart of an embodiment of the invention.

DESCRIPTION OF THE PREFERRED EMBODIMENT

Referring to the drawing in particular, the invention embodied therein comprises a coking plant producing 50,000 $Mn^3$ per hour of coke oven gas, from which ammonia and hydrogen sulfide are to be removed by the principle of scrubbing and recirculating gases. The deacidizer of the scrubber delivers vapors in amounts specified in the table below in column A.

|  | PERCENTAGE BY VOLUME | | | | | | |
| Substance/Gas | A | B | C | D | E | F | G |
| --- | --- | --- | --- | --- | --- | --- | --- |
| $H_2S$ | 12.5 | 0.78 | 6.3 | 0.78 | 4.1 | 1.3 | 1.3 |
| $COS + CS_2$ | — | — | 0.3 | — | 0.3 | 0.3 | 0.3 |
| $SO_2$ | — | 0.39 | — | 0.39 | 2.2 | 0.8 | 0.8 |
| S liq. | — | — | — | — | — | 0.2 | 0.2 |
| $NH_3$ | 23.0 | — | — | — | — | — | — |
| HCN | 1.5 | — | — | — | — | — | — |
| $N_2$ | — | 39.50 | 21.0 | 39.50 | 20.8 | 20.8 | 20.8 |
| $H_2$ | — | 4.90 | 2.6 | 4.90 | 2.6 | 2.6 | 2.6 |

-continued

| Substance/Gas | PERCENTAGE BY VOLUME | | | | | | |
|---|---|---|---|---|---|---|---|
| | A | B | C | D | E | F | G |
| $H_2O$ | 50.2 | 3.55 | 42.8 | 3.55 | 43.50 | 47.1 | 47.1 |
| CO | — | 4.10 | 2.2 | 4.10 | 2.2 | 2.2 | 2.2 |
| $CO_2$ | 12.5 | 46.78 | 24.8 | 46.78 | 24.5 | 24.7 | 24.7 |
| $KW (C_6)$ | 0.3 | — | — | — | — | — | — |
| t °C | 80 | 30 | 1000 | 30 | 1200 | 160 | 240 |
| p (bar) | 1.3 | 1.3 | 1.3 | 1.3 | 1.3 | 1.3 | 1.3 |
| $Nm^3/h$ | 2000 | 1386 | 4150 | 154 | 4200 | 4160 | 4160 |

Sulfer is produced from the $H_2S$ content in such a way as not to damage the catalyst of the sulfur recovery palnt (Claus unit). To this end, the ammonia is completely decomposed and the gases must have reducing properties. The vapors, in the proportions shown in column A of the Table, are introduced into burners 2 of a reactor 3 through line 1. 400 $Nm^3$ of pure oxygen (99.7%) are supplied through lines 11 and 4 to burner 2 and the waste gases are supplied through lines 9 and 4 as specified in the Table in column B. A gas flame burns in combustion chamber 5 of reactor 3 and the resultant gaseous products are then passed into space 6 and over a catalyst therein comprising metallic nickel which is deposited on bodies of gamma aluminum oxide. The gases reaching a collector chamber 7 are in the proportions shown in column C of the Table. These gases are directed through a line 8 and into a post-combustion furnace 10 where they are again mixed with pure oxygen which is supplied in the amount of 120 $Nm^3$ through lines 11 and 12. Waste gases are also mixed at this point through lines 9 and 12, in an amounts indicated in the Table in column D. The resulting reaction gases or products are specified in the Table in column E.

These remaining gases are cooled as they pass into a waste-heat boiler 13 which is supplied with boiler feed water through a line 14 and delivers 1.8 t per hour of steam having a pressure of 4 bar, through a line 15. The cooled gases then enter a separator 16 in which liquid sulfur accumulates in the amount of 240 kg per hour and is drawn off through a line 17. This sulfur is formed in furnace 10 in accordance with the equation $2H_2S + SO_2 \rightarrow 3S + 2H_2O + 35$ Kcal and undergoes condensation upon cooling. With the sulfur partly removed, the gases which are cooled to 160° C are directed through a line 18 into a heat exchanger 19 where they are heated by the heat of reaction of the following catalytic Claus process. The state and proportions of the remaining gases before and after the heat exchanger 19 are shown in Table, in columns F and G. Through a line 20 they pass into a Claus reactor 21 which is filled with an aluminum oxide or bauxite base Claus catalyst on which COS and $CS_2$ are also converted. The gases leave apparatus 21 through a line 22 and are conducted, through heat exchanger 19 and a line 23, into a sulfur condenser 24. The condenser is supplied with boiler feed water through a line 25 and 107 kg per hour of liquid sulfer are removed through line 28 and united with the sulfur drained through line 17. Condenser 24 also delivers, through line 26, 0.2 t of steam with a pressure of 2 bar. The remaining gaseous product is then cooled to 135° C and directed, through a line 27, to a condenser 28' from which condensed water in the amount of 1530 kg is drained through a line 31.

The remaining product forms a waste gas which has a temperature of 30° C at this point and a volume of 2186 $Nm^3$ of which 1540 $Nm^3$ (1386 + 154) are recycled back into the process, through a line 29, compressor 30 and lines 9, 4 and 12. This results in a total sulfur output of 97%, because the waste gas still contains some $H_2S$ and $SO_2$ (see the Table, columns B and D). Waste gases in the amount of 640 $Nm^3$ are removed from the process through a line 32. They may be worked following known methods whereby the sulfur output can be increased to more than 98%.

With a conversion with air 2080 $Nm^3$ of nitrogen would necessarily be introduced into the process along with the 520 $Nm^3$ of oxygen. The inventive method, however, using oxygen for the conversion, provides the recirculating of 1540 $Nm^3$ of waste gases which do not require further working.

While a specific embodiment of the invention has been shown and described in detail to illustrate the appplication of the principles of the invention, it will be understood that the invention may be embodied otherwise without departing from such principles.

What is claimed is:

1. A method for converting the ammonia and hydrogen sulfide in coke oven gases into water, nitrogen and sulfur using waste gases from which ammonia and hydrogen sulfide have been removed, comprising mixing said coke oven gases with oxygen enriched gas and a first portion of 80 to 90% of the waste gases, burning said mixture and passing the resulting gaseous products over a catalyst to convert the ammonia into water and nitrogen, mixing these gases which have passed over the catalyst with oxygen enriched gas and a second portion of the waste gases, cooling the mixture and removing some of the condensed sulfur, further processing the gases which have some of the sulfur removed to remove additional sulfur to form a remaining product gas, condensing the water from said remaining product gas, and using a portion of the resulting gaseous products to form a part of the waste gases, 80 to 90% of said oxygen enriched gas being added in said first mentioned mixture and 10 to 20% is added in said second mentioned mixture.

2. A method according to claim 1, wherein said oxygen enriched gas is oxygen enriched air.

3. A method according to claim 1, wherein said oxygen enriched gas is pure oxygen.

4. A method for converting the ammonia and hydrogen sulfide in coke oven gases into water, nitrogen and sulfur using waste gases from the method from which ammonia and hydrogen sulfide have been removed, comprising mixing said coke oven gases with oxygen enriched gas and a first portion of 80 to 90% of the waste gases, burning said mixture and passing the resulting gaseous products over a catalyst to convert the ammonia into water and nitrogen, mixing these gases which have passed over the catalyst with oxygen enriched gas and a second portion of the waste gases, cooling the mixture and removing some of the condensed sulfur, further processing the gases which have some of the sulfur removed to remove additional sulfur to form a remaining product gas, condensing the water from said remaining product gas, and using a portion of the resulting gaseous products to form a part of the waste gases, said first portion of said waste gases further comprising 80 to 90% of said waste gases and said second portion comprises 10 to 20% of said waste gases.

* * * * *